US008180397B2

(12) United States Patent
Stenmark et al.

(10) Patent No.: US 8,180,397 B2
(45) Date of Patent: May 15, 2012

(54) MOBILE COMMUNICATIONS DEVICE ACCESSORY IDENTIFICATION SYSTEM, AN IMPROVED ACCESSORY FOR USE WITH A MOBILE COMMUNICATIONS DEVICE, AND A METHOD OF IDENTIFYING SAME

(75) Inventors: Fredrik Martin Stenmark, Kitchener (CA); Niels Praestegaard, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 317 days.

(21) Appl. No.: 12/607,908

(22) Filed: Oct. 28, 2009

(65) Prior Publication Data

US 2011/0098085 A1 Apr. 28, 2011

(51) Int. Cl.
*H04B 1/38* (2006.01)

(52) U.S. Cl. .................................... 455/557; 455/575.1

(58) Field of Classification Search ............... 455/550.1, 455/557.1, 575.1, 575.2, 575.6, 90.1, 90.3, 455/347, 351, 557; 438/668, 669
See application file for complete search history.

(56) References Cited

U.S. PATENT DOCUMENTS

| | | | |
|---|---|---|---|
| 5,859,522 A | 1/1999 | Theobald | |
| 6,856,046 B1 | 2/2005 | Scarlett et al. | |
| 7,727,029 B2 * | 6/2010 | Bolin et al. | 439/669 |
| 2004/0198442 A1 | 10/2004 | Chan et al. | |
| 2005/0090141 A1 | 4/2005 | Peng et al. | |
| 2007/0178947 A1 * | 8/2007 | Kim | 455/575.2 |
| 2008/0164994 A1 | 7/2008 | Johnson et al. | |
| 2009/0061694 A1 | 3/2009 | Kawasaki et al. | |
| 2009/0179768 A1 | 7/2009 | Sander et al. | |
| 2009/0191914 A1 | 7/2009 | Stahl | |

FOREIGN PATENT DOCUMENTS

| | | |
|---|---|---|
| EP | 1133185 | 9/2001 |
| EP | 1191770 | 3/2002 |
| EP | 1318576 | 6/2003 |
| EP | 1318652 | 6/2003 |
| EP | 1542438 | 6/2005 |
| WO | 2004057711 | 7/2004 |
| WO | 2006045617 | 5/2006 |

OTHER PUBLICATIONS

Banerjea, Robin, Extended European Search Report for EP09174398 , Apr. 6, 2010.
Maxim IC, "DS2411 Silicon Serial Number with VCC Input", Dec. 21, 2006.

* cited by examiner

*Primary Examiner* — Thanh Le
(74) *Attorney, Agent, or Firm* — Integral Intellectual Property Inc.; Miriam Paton

(57) ABSTRACT

An identification system includes a mobile communications device and an accessory having a connection plug with a conical tip. An insulating ring extends about the conical tip portion to define a tip detection contact. The device includes a tip detection pin positioned adjacent to an interior end portion of a connection socket on the device. The tip detection pin engages the tip detection contact to enable identification of the accessory by the mobile communications device. An improved accessory is for use with a mobile communications device. A method identifies an accessory which has its connection plug inserted into a socket on a mobile communications device.

11 Claims, 10 Drawing Sheets

210 200 218 220 240 242 244 236 246 ACCESSORY DEVICE 276 224 230 226 234 248 290 232 222 294 296 100 298 276 292

MOBILE COMMUNICATIONS DEVICE ACCESSORY IDENTIFICATION SYSTEM, AN IMPROVED ACCESSORY FOR USE WITH A MOBILE COMMUNICATIONS DEVICE, AND A METHOD OF IDENTIFYING SAME

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

The present invention relates generally to a mobile communications device accessory identification system, an improved accessory for use with a mobile communications device, and a method of identifying same.

BACKGROUND

Handheld wireless communication devices may have been previously provided with accessory connection sockets—e.g., 3.5 mm audio sockets. The accessory connection sockets and the related accessories may have been used for a variety of functions. For example, accessories may have been used to provide a headset for the mobile communications device, such as may have included earphones and a microphone. Other accessories may have been used to provide the mobile communications device with additional camera functionality. Of course, accessories may also have been put to other uses in mobile communications devices.

Current headset connection plugs for use with mobile communications devices may utilize a standard 3.5 mm connection plug profile having four electrical contact rings, along the length of the plug's substantially cylindrical bearing surface. When connected to a mating connection socket, electrical connections may have been made exclusively along the bearing surface at the side of the plug.

DETAILED DESCRIPTION

As noted above, the present invention relates to an accessory identification system 200, including a related mobile communications device 100, and to a method 300 of identifying an accessory 210 used with the mobile communications device 100.

As best seen in FIGS. 3, 7 and 10-11, the accessory identification system 200 includes the mobile communications device 100 and the accessory (alternately, hereinafter, an "improved accessory") 210.

Figure 1:
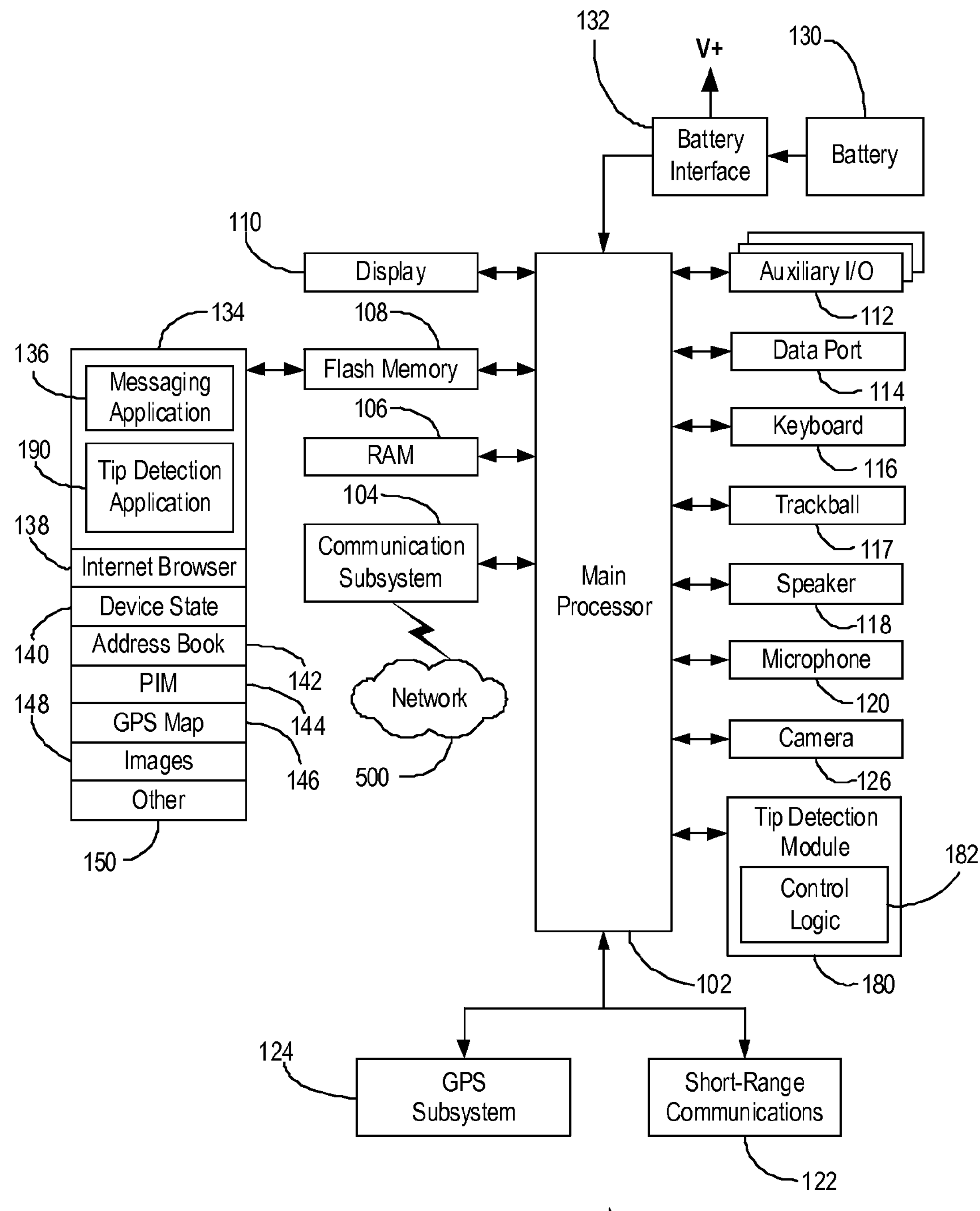
FIG. 1 is a schematic block diagram of various components that may be found in a handheld mobile communication device.

In an illustrative embodiment, the invention may be practiced with a handheld mobile communications device 100 in a wireless operating environment. Shown in FIG. 1 is a schematic block diagram of an illustrative handheld mobile communications device 100. The communication device 100 may comprise a number of components, including a processor 102 (e.g., a main processor 102) which controls the overall operation of the mobile communications device 100. Communication functions, including data and voice communications, may be performed through a communication subsystem 104. The communication subsystem 104 may receive messages from, and send messages to, a wireless network 500.

The main processor 102 may also interact with additional subsystems such as a random access memory (RAM) 106, a flash memory 108, a display 110, an auxiliary input/output (I/O) subsystem 112, a data port 114, a keyboard 116, a trackball 117, a speaker 118, a microphone 120, short-range communications 122, a GPS subsystem 124, a camera module 126, and an accessory identification module (alternately, herein the "tip detection module") 180.

Some of the subsystems of the communication device 100 may perform communication-related functions, and some may provide "resident" or on-device functions. By way of example, the display 110 and the keyboard 116 may be used for both communication-related functions, such as entering a text message for transmission over the network 500, and device-resident functions such as a calculator or task list. The trackball 117 may be used for various navigation functions, such as navigating through a graphical user interface (GUI) menu displayed on display 110. The trackball 117 may also be configured with a secondary actuation feature, such as allowing a user to depress the trackball, to allow selection of a highlighted item.

The GPS subsystem 124 may be operatively connected to the main processor 102 to pass acquired latitude and longitude coordinates to one or more software applications 134, and to store the latitude and longitude coordinates as may be required into flash memory 108 or RAM 106.

Image capture using camera module 126 may be initiated by a user controlling a dedicated camera shutter, or a context dependent programmable button or key (on keyboard 116, for example) that may act as a camera shutter button.

As will be described in detail further below, in order to use the accessory identification system 200 to identify the accessory 210 used with the mobile communications device 100, the tip detection module 180 may be provided with control logic 182.

Still referring to FIG. 1, operating system software used by the main processor 102 is typically stored in a persistent store such as flash memory 108. Those skilled in the art will appreciate that the operating system, specific device applications, or parts thereof, may be temporarily loaded into a volatile store, such as the RAM 106, for processing by main processor 102.

The mobile communications device 100 may send and receive communication signals over the wireless network 500 after required network registration or activation procedures have been completed. Network access may be associated with a subscriber or user of the mobile communications device 100.

The mobile communications device 100 may be a battery-powered device and may include a battery interface 132 for receiving one or more rechargeable batteries 130. In some embodiments, the battery 130 may be a smart battery with an embedded microprocessor. The battery interface 132 is coupled to a regulator (not shown), which assists the battery 130 in providing power V+ to the mobile communications device 100. The battery 130 may be used to power all components and modules in the mobile communications device 100, including the accessory identification system 200.

The main processor 102, in addition to its operating system functions, enables execution of various software applications 134 on the mobile communications device 100. A subset of software applications 134 that control basic device operations, including data and voice communication applications, will normally be installed on the mobile communications device 100 during its manufacture.

The software applications 134 may include a messaging application 136. The messaging application 136 can be any suitable software program that allows a subscriber or user of the mobile communications device 100 to send and receive wireless text communications. Various alternatives exist for the messaging application 136 as is well known to those skilled in the art. Messages that have been sent or received by the user are typically stored in local storage such as flash memory 108 of the mobile communications device 100, or in some other suitable storage element in the mobile communications device 100. In an alternative embodiment, some of the sent and received messages may be stored remotely from the mobile communications device 100 such as in a data store of an associated host system that the mobile communications device 100 communicates with. In an embodiment, the messaging application 136 may include a Message List user interface that is configured to allow a user to see a list of message objects (i.e. email messages) in a convenient list form.

The software applications 134 may also include a GPS map application 146 for providing geographic navigation, and location coordinates for geotagging objects. GPS map application 146 may be configured to operatively connect to GPS subsystem 124 to receive GPS latitude and longitude coordinates for a current position of the communication device 100. GPS map application 146 may also store scalable maps of various geographic regions in order to show the current position of communication device 100 on the map. As well, the GPS map application 146 may be configured to obtain latitude and longitude location coordinates by allowing a user to select a position on the GPS map.

Still referring to FIG. 1, the mobile communications device 100 may execute an Image Applications Module 148 that may be operatively integrated with the camera module 126, the main processor 102, the RAM 106, the display 110 and various other modules and components to provide various image application functions for the images captured by the camera module 126.

The mobile communications device 100 may further include an Internet browser 138, a device state module 140, an address book 142, a Personal Information Manager (PIM) 144, and various other modules 150. Additional software applications may also be loaded onto the mobile communications device 100 through at least one of the wireless network 500, the auxiliary I/O subsystem 112, the data port 114, the short-range communications subsystem 122, or another device subsystem.

Figure 2:
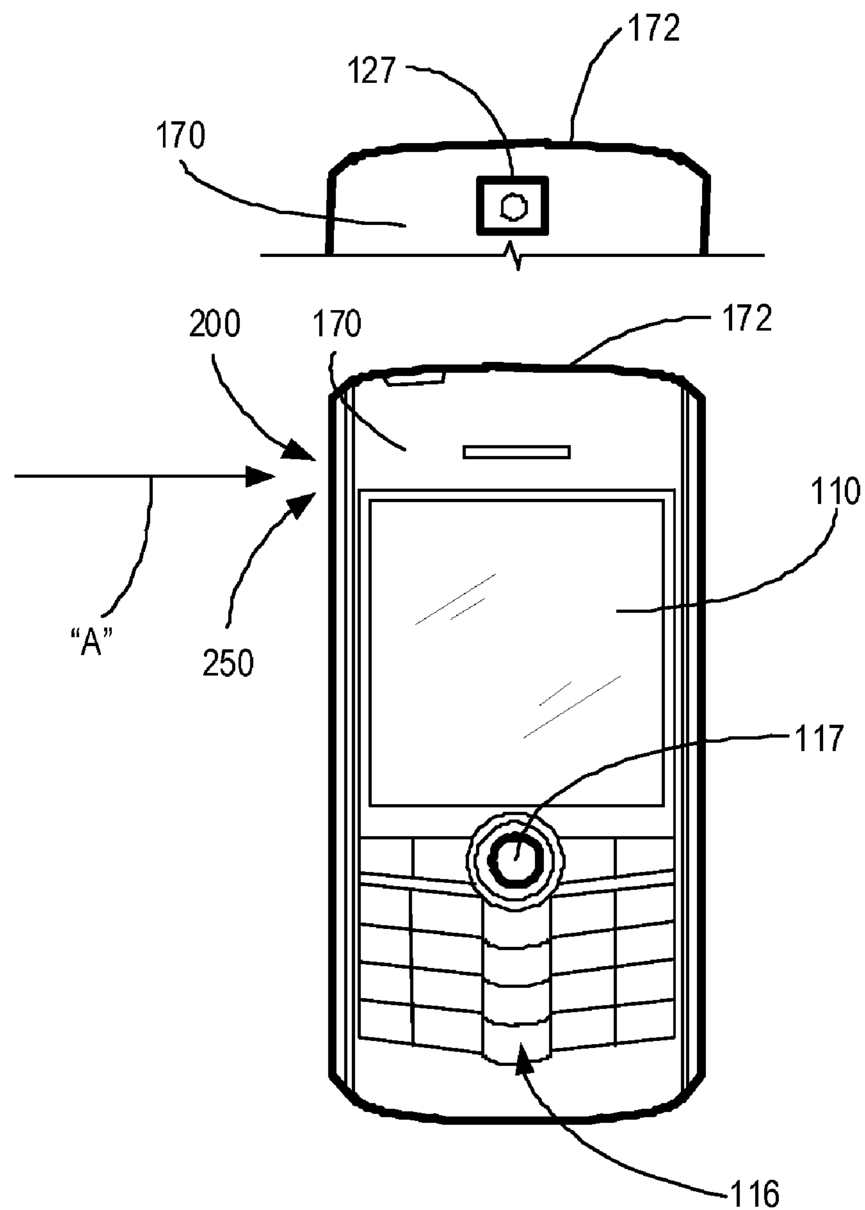
FIG. 2 is an illustrative example of a handheld mobile communication device that provides an operating environment for an accessory identification system, according to the invention.
Figure 3:
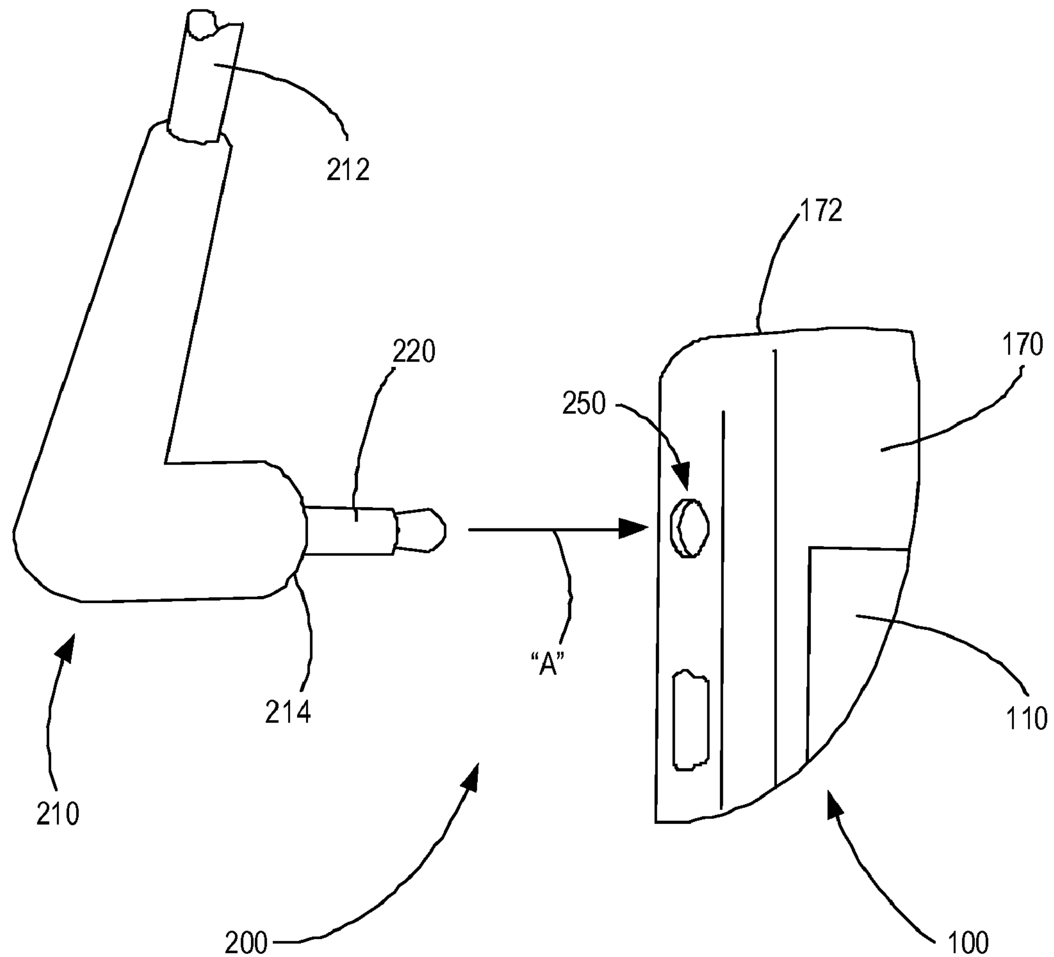
FIG. 3 is a side perspective view of a mobile communications device and an accessory, shown in a disconnected configuration.

Now referring to FIG. 2, shown is an illustrative front view of a handheld mobile communications device 100 that may provide a suitable operating environment. As shown, the mobile communications device 100 may include a housing 170, a display 110, a keyboard 116, and other input or navigation means such as a trackball 117. The display 110 may be configured to display various screens allowing the user of device 100 to view screen outputs from the various software applications 134, including an accessory identification application (alternately, herein the "tip detection application") 190. Display 110 may also be configured to provide a touch-sensitive screen input in response to a prompt or query displayed on display 110. In an embodiment, the integrated camera 126 may provide a camera lens 127 on the back of the communication device 100, such that a user may use the display 110 as a camera viewfinder for framing an image.

Figure 6:
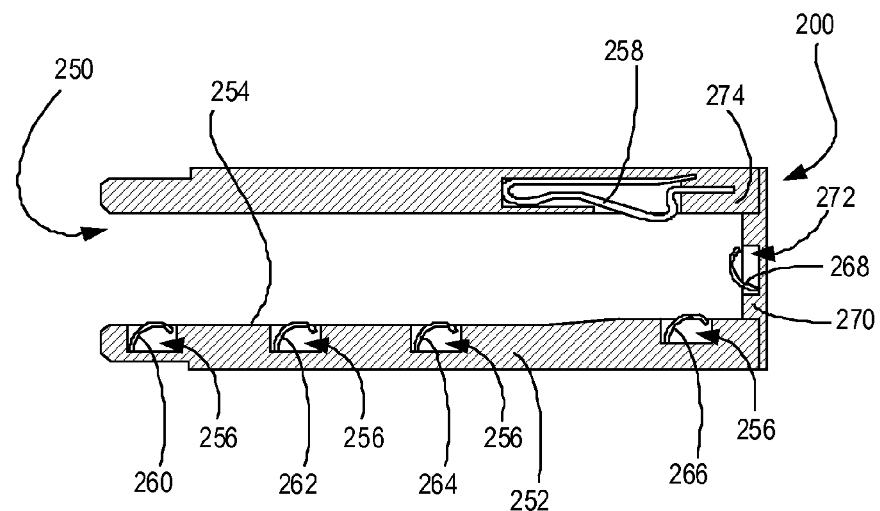
FIG. 6 is a side partially sectional view of a mobile communications device, according to the invention.
Figure 7:
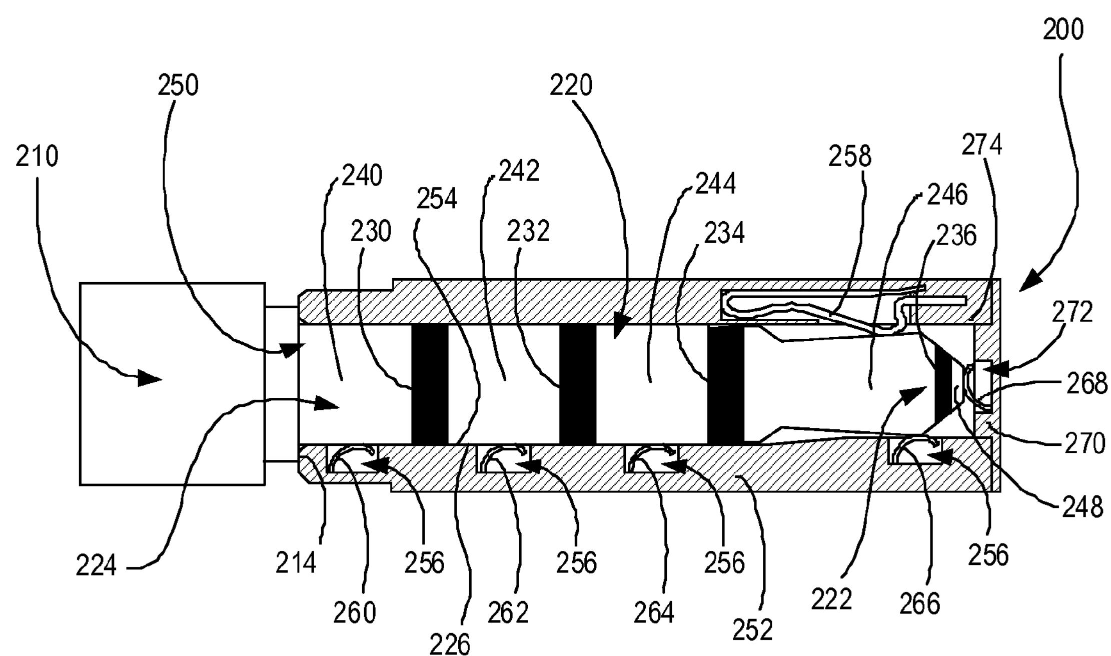
FIG. 7 is a side partially sectional view of the mobile communications device accessory identification system, according to the invention.
Figure 9:
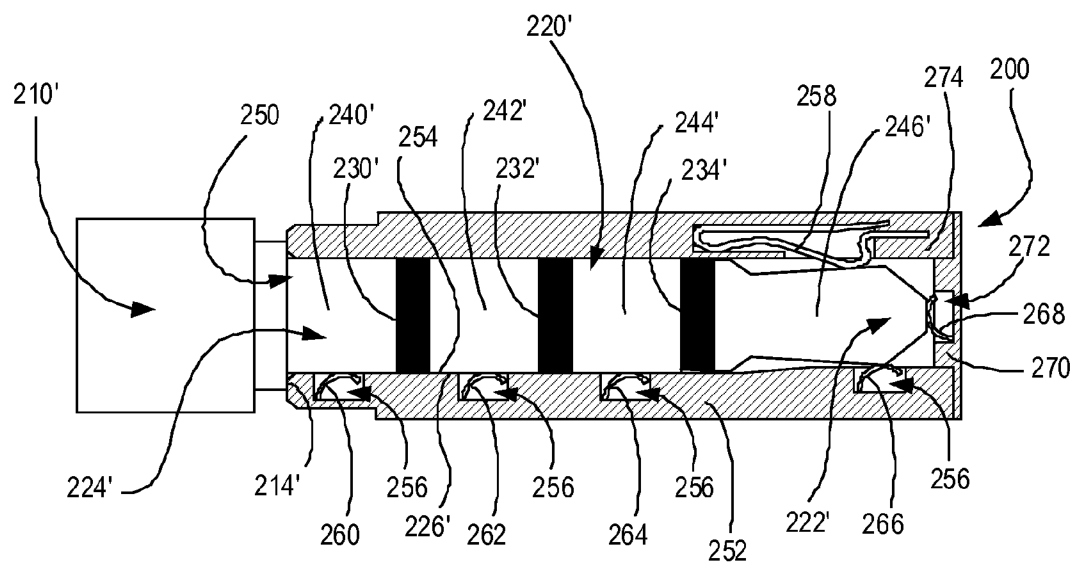
FIG. 9 is a view similar to FIG. 6, showing the mobile communications device, according to the invention, in a mated configuration with a prior art accessory.

Now, with reference to FIGS. 2-3, 6-7 and 9-11, it will be appreciated that the mobile communications device 100 preferably includes a tip detection pin 268, electrical contact pins 260, 262, 264, 266, the housing 170, and an accessory connection socket 252 extending through a wall 172 of the housing 170. (The housing 170 is clearly shown in FIGS. 2 and 3, and the tip detection pin 268, electrical contact pins 260, 262, 264, 266, and the accessory connection socket 252 are best seen in FIGS. 6-7 and 9.) The connection socket 252 preferably extends inward from an opening 250 in the wall 172 of the housing 170 towards an interior end portion 274 of the connection socket 252.

As best seen in FIG. 6, the connection socket 252 includes a substantially barrel-shaped bearing surface 254 which defines apertures 256 formed therein. Each of the contact pins 260, 262, 264, 266 extends through a respective one of the apertures 256. The socket 252 preferably also includes a retention member 258. The mobile communications device 100 preferably also includes a positioning member 270 securely engaging the connection socket 252. In one preferred embodiment of the invention, which is shown in FIGS. 6, 7 and 9, the positioning member 270 may be provided in the form of a cap member securely engaging interior end portion 274 of the connection socket 252. (Accordingly, the terms "positioning member" and "cap member" may be used interchangeably herein—even though the positioning member 270 is not so limited.) The cap member 270 is preferably shaped to define a cap aperture 272 in an inner surface thereof. The tip detection pin 268 may preferably extend through the cap aperture 272. The positioning member 270 positions the tip detection pin 268 substantially adjacent to the interior end portion 274 of the connection socket 252. Alternately, instead of being provided in the form of a cap member, the positioning member 170 may provide a spring-loaded connector mounting—e.g., a pogo-pin mounting or a leaf-spring mounting—for the tip detection pin 268.

Figure 11:
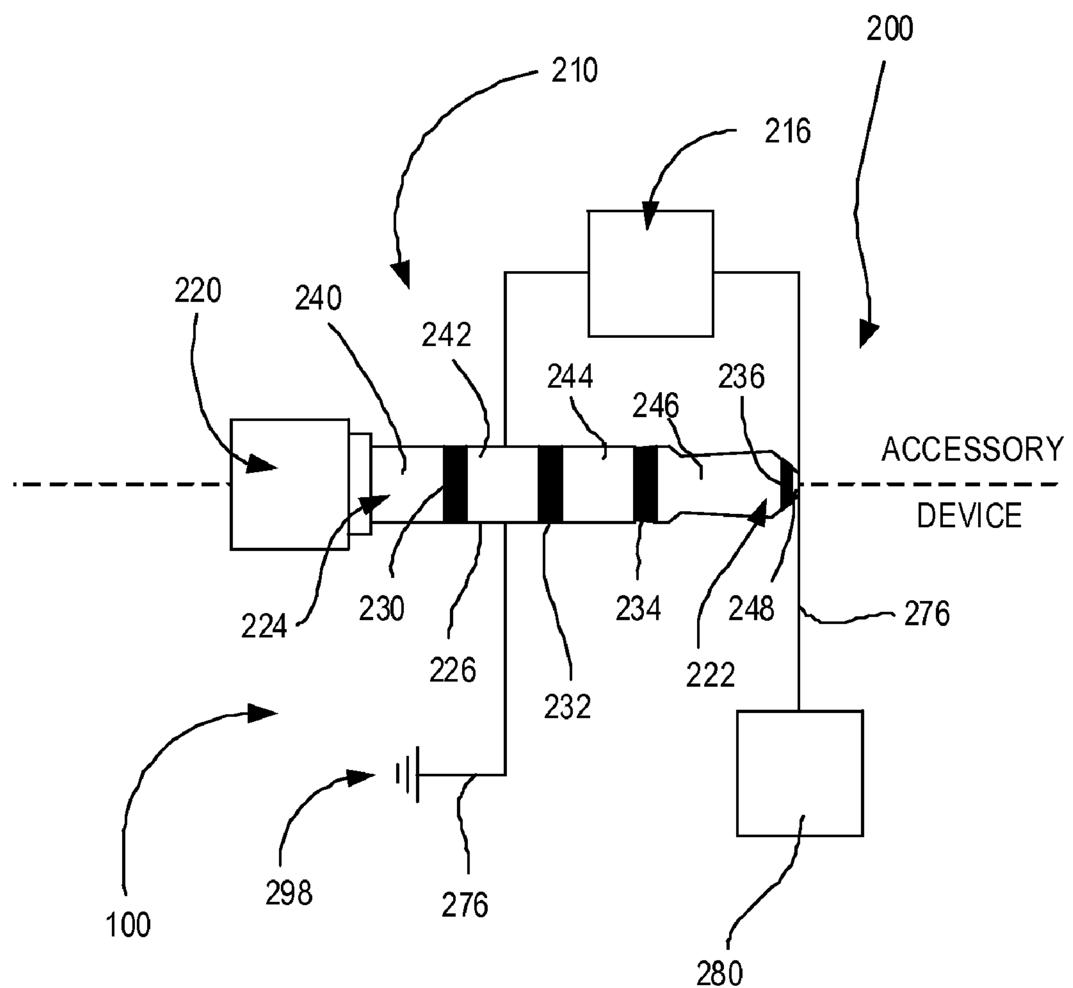
FIG. 11 is a schematic diagram of a system, showing a serial number device, according to another embodiment of the invention.

As shown in FIG. 11, the mobile communications device 100 may also include a serial bus master device 280. The serial bus master device 280 is preferably electrically coupled with the tip detection pin 268 by a lead wire 276. A serial number reference database (not shown) may preferably, but need not necessarily, be provided as part of the serial bus master device 280.

Figure 10:
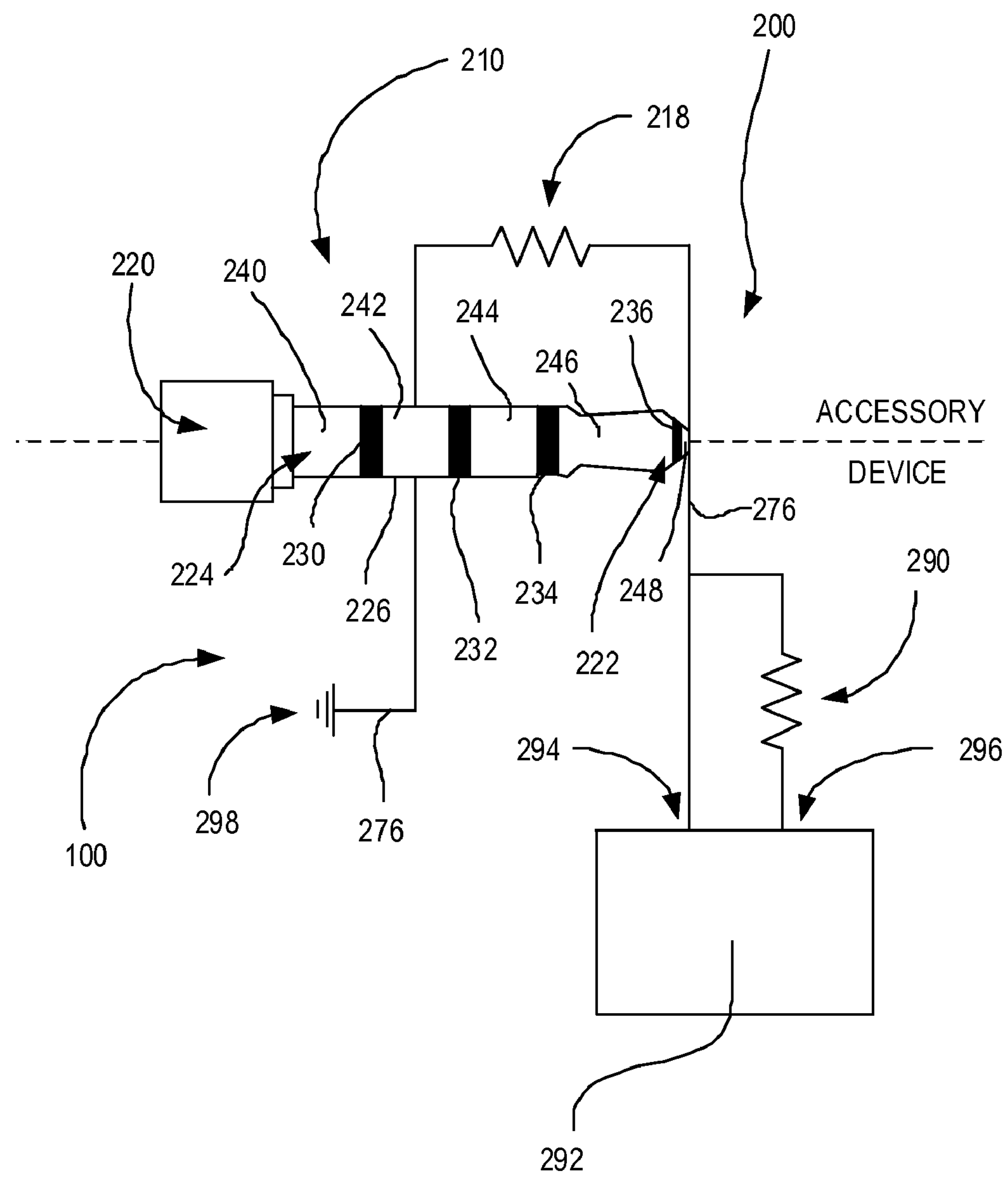
FIG. 10 is a schematic diagram of a system, showing an identification resistor, according to one embodiment the invention.

Alternately and/or in addition, the mobile communications device 100 may include a reference resistor 290 and an analog/digital converter 292 (as shown in FIG. 10). The analog/digital converter 292 may preferably be provided with first and second voltage connections 294, 296. The reference resistor 290 is electrically coupled between the second voltage connection 296 and the tip detection pin 268. The tip detection pin 268 is also electrically coupled, in parallel, to the first voltage connection 294 by a lead wire 276.

As shown in FIGS. 3, 5, 7-8 and 10-11, the accessory 210 includes a cable 212, a stop member 214 and a connection plug 220. The connection plug 220 defines a substantially conical tip portion 222, a distal end portion 224, and a substantially cylindrical bearing surface 226 extending therebetween. Notably, the connection plug 220 includes a tip insulating ring 236 extending about the conical tip portion 222 of the plug 220 to define a tip detection contact 248.

Figure 5:
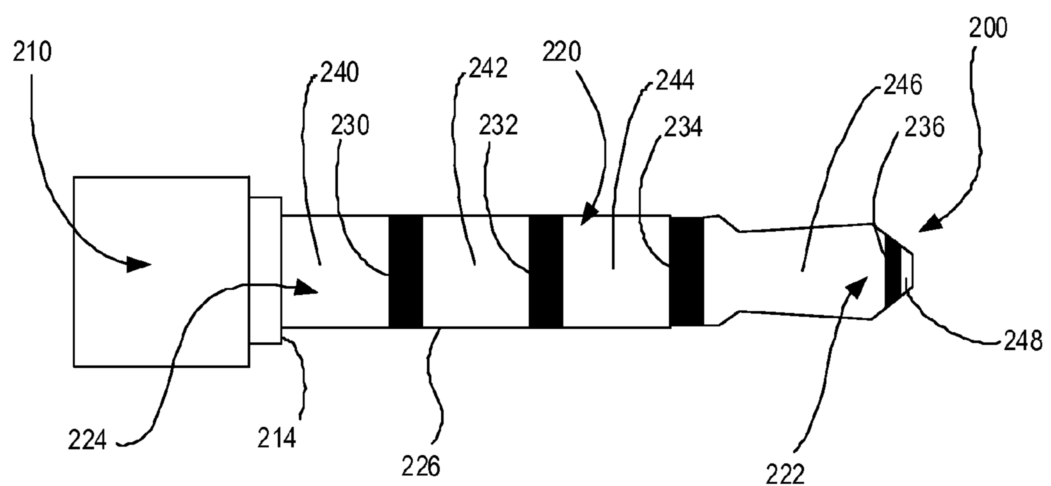
FIG. 5 is a side view of an improved accessory, according to the invention.

As best seen in FIG. 5, the connection plug 220 preferably also includes electrical insulating rings 230, 232, 234. Each of the electrical insulating rings 230, 232, 234 circumscribes the substantially cylindrical bearing surface 226. In this manner, electrical insulating rings 230, 232, 234 define electrical contact rings 240, 242, 244, 246.

It may be worthwhile to note that, as shown in FIGS. 5 and 7-8 and 10-11, the substantially cylindrical bearing surface 226 may preferably be defined to include at least the portion of the bearing surface 226 wherearound electrical insulating ring 234 is circumscribed to define electrical contact ring 246. In this regard, and while the electrical insulating ring 234 may be depicted as having a somewhat frusto-conical shape, it is still defined as being substantially cylindrical for the purposes of the present invention.

According to the invention, in an exemplary embodiment of a standard 3.5 mm connection plug 220 on a headset accessory 210, the electrical contact rings 240, 242, 244, 246 preferably include a microphone ring 240, a ground ring 242, right and left channel out rings 244, 246, and the tip detection contact 248.

As shown in FIGS. 10 and 11, the accessory 210 may also include a serial number device 216 (as shown in FIG. 11) and/or an identification resistor 218 (as shown in FIG. 10). Preferably, the serial number device 216 and/or the identification resistor 218 is electrically coupled between the tip detection contact 248 and an operatively grounded one of the electrical contact rings (e.g., the ground ring) 242.

In use, and as shown in FIG. 7, the connection plug 220 engages the connection socket 252, with the stop member 214 abutting the socket 252 and with the retention member 258 engaging the plug 220. In at least this sense, the plug 220 may be said to "operatively" engage the socket 252. Similarly, each of the contact pins 260, 262, 264, 266 operatively engages a respective one of the electrical contact rings 240, 242, 244, 246, and the tip detection pin 268 operatively engages the tip detection contact 248 of the plug 220.

Tip detection circuitry of the mobile communications device 100 need not be directly linked to the configuration of a particular headset connection plug 220, but in this specification and in the accompanying drawings, a headset connection plug 220 may be used for ease of reference. It is worthwhile to specifically note the present invention is not so limited. Advantageously, the present invention may be used in association with any number of different accessories 210 and/or configurations for the electrical contact rings 240, 242, 244, 246 of the connection plug 220, whether in association with a mobile communications device 100 or otherwise. In a typical headset connection plug 220, however (and as described elsewhere herein), there is preferably provided the microphone contact ring 240, the ground contact ring 242, the right and left channel out contact rings 244, 246, and tip detection contact 248 according to the invention.

The identification of the tip detection contact 248 on the connection plug 220, and its associated accessory 210, may preferably be made by a passive and/or an active tip detection methodology (as will be appreciated from FIGS. 10 and 11, respectively). Preferably, in accordance with the passive tip detection methodology (and as will be appreciated from FIG. 10), the identification resistor 218 may simply be electrically connected to the ground contact ring 242 in the accessory 210. Generally, because the identification resistor 218 and the reference resistor 290 are electrically coupled with the tip detection contact 248 and the tip detection pin 268, respectively—with the tip detection contact 248 being operatively (i.e., in use) electrically coupled with the tip detection pin 268—the mobile communications device 100 may identify the accessory by resistance. The passive tip detection methodology relies on a voltage divide ratio between (i) a voltage measured via the reference resistor 290 in the mobile communications device 100, and (ii) another voltage measured substantially directly from the identification resistor 218. These voltages are preferably measured, respectively, at the second voltage connection 296 and the first voltage connection 294 of the analog/digital converter 292 in on the mobile communications device 100. In accordance with the passive tip detection methodology, the mobile communications device 100 will preferably determine the type of accessory 210 by referencing the voltage divide ratio against a look up table (not shown).

In accordance with the active tip detection methodology (and as will be appreciated from FIG. 11), a one-wire interface serial number circuit may preferably be used. An exemplary one-wire interface serial number circuit may utilize the DS2411 circuit offered by Maxim Integrated Products, Inc. of Sunnyvale, Calif. In accordance with the active tip detection methodology, each type of accessory 210 to be identified may preferably be integrally provided with the serial number device 216. Each serial number device 216 may preferably be associated with an identifiable serial number (not shown)—e.g., in a known set of serial numbers—to allow the mobile communications device 100 to determine the type of accessory 210 connected.

Alternately, a one-wire interface circuit utilizing a built-in user programmable memory may be used in accordance with the active tip detection methodology. In such embodiments, the accessory 210 type will preferably be directly programmed into the chip, preferably so as to facilitate accessory 210 detection by the mobile communications device 100.

In accordance with the active tip detection methodology, because the serial number device 216 and the serial bus master device 280 are electrically coupled with the tip detection contact 248 and the tip detection pin 268, respectively—with the tip detection contact 248 being operatively electrically coupled with the tip detection pin 268—the mobile communications device 100 may identify the accessory 210 by serial number. The identification of the accessory 210 by serial number will preferably be made with reference to the serial number reference database (not shown)—whether same is provided in the serial bus master device 280 or otherwise.

The active tip detection methodology may offer additional advantages which (though same may not be essential to the present invention) may help to substantially prevent, or to reduce the chance of, "pirate" copying of the accessory 210 identification data, as the mobile communications device 100 may be adapted to simply reject accessories 210 outside the acceptable set of serial numbers.

Whether the passive and/or the active tip detection methodology is used, the accessory 210 may be identified by the mobile communications device 100—e.g., by referencing the voltage divide ratio against the look-up table, and/or the serial number against the serial number reference database. As shown in FIG. 1, the tip detection module 180 is preferably provided with control logic 182. The tip detection module 180 may include the serial bus master device 280 and/or the analog/digital converter 292. The control logic 182 and the tip detection application 190 may together encode the main processor 102 to identify the accessory 210 and/or to automatically assign accessory input and output identities to the contact pins 260, 262, 264, 266 in dependence upon the accessory 210 identified by the mobile communications device 100, preferably so as to optimize or otherwise modify performance of the accessory 210.

Preferably, the main processor 102 is operatively encoded (i.e., in use) to identify the accessory 210 and to assign the aforesaid accessory input and output identities to the contact pins 260, 262, 264, 266 in dependence upon the accessory 210 identified by the mobile communications device 100, and/or in dependence upon one of the software applications 134 (e.g., the tip detection application 190) operatively loaded onto the device 100. The tip detection application 190 may be a software application, operatively loaded onto the device 100, that interfaces with other software applications 134 to automatically assign the aforesaid accessory input and output identities in response thereto. For example, the tip detection application 190 may interface with software applications 134 that control basic device operations or with the messaging application 136, the GPS map application 146, the Image Applications Module 148, or one of the various other modules 150. Alternately, any of these software applications 134 may be adapted to directly identify the accessory 210 and/or to assign the aforesaid accessory input and output identities, without the tip detection application 190.

Preferably, at least one processor (e.g., the main processor) 102 of the mobile communications device 100 is operatively encoded, as aforesaid, to automatically assign the accessory input and output identities to the contact pins 260, 262, 264, 266. It is also noted above that the accessory input and output identities are preferably assigned to the contact pins 260, 262, 264, 266 in dependence upon the accessory 210 identified by the mobile communications device 100.

For example—where the electrical contact rings 240, 242, 244, 246 of the accessory 210 include a microphone ring 240, a ground ring 242, and right and left channel out rings 244, 246—the identities assigned to the contact pins 260, 262, 264, 266 will preferably include a microphone pin identity 260, a ground pin identity 262, and right and left channel out pin identities 264, 266. The mobile communication device 100 will then be "operatively" adapted (i.e., in use) to receive a microphone signal from the microphone ring 240, to ground the ground ring 242 (via a lead wire 276 as shown in FIGS. 10 and 11), and to transmit right and left channel out signals to the right and left channel out rings 244, 246.

Alternate accessory input and output identities may be assigned to the contact pins 260, 262, 264, 266 by the main processor 102 when other accessories 210 are identified by the mobile communications device 100. For example, when a headphones accessory 210 is detected, a null accessory input and output identity will be assigned to contact pin 260. Still further, when a camera accessory 210 is identified, the main processor 102 will automatically assign different accessory input and output identities to the contact pins 260, 262, 264, 266.

Figure 4:
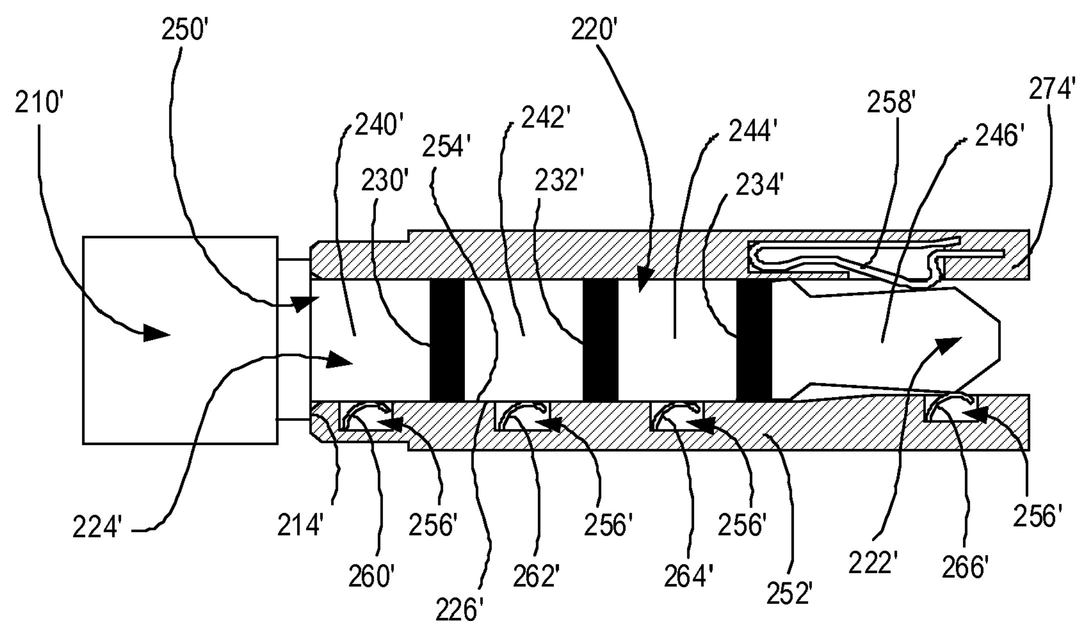
FIG. 4 is a side partially sectional view of a prior art accessory and a prior art mobile communications device, shown in a mated configuration.
Figure 8:
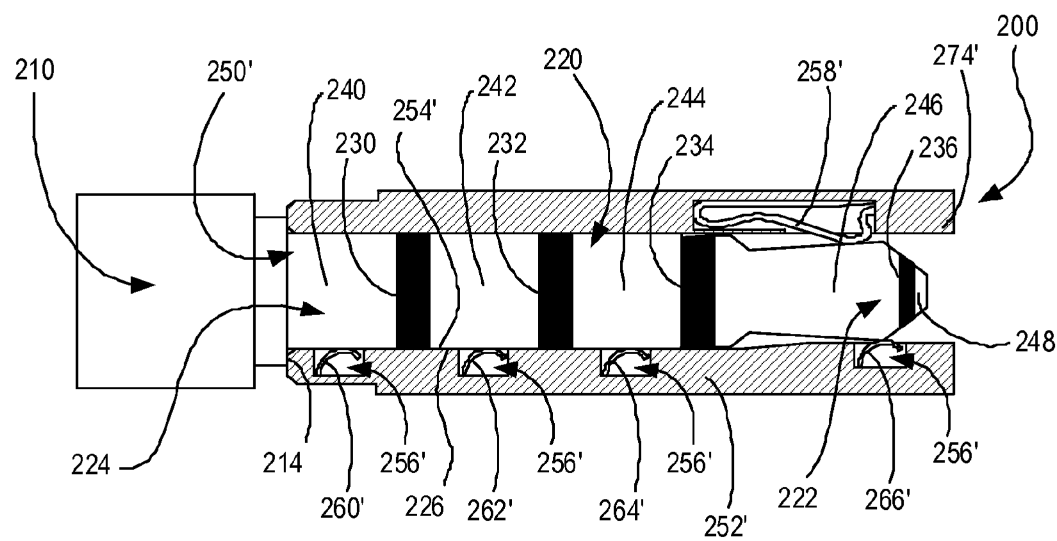
FIG. 8 is a view similar to FIG. 5, showing the improved accessory, according to the invention, in a mated configuration with a prior art mobile communications device.

It will be appreciated that FIG. 4 shows a prior art connection plug 220' of a prior art accessory 210' in a mated configuration with a prior art connection socket 252'. FIG. 8 shows a connection plug 220 of an improved accessory 210, according to the present invention, in the mated configuration with the prior art connection socket 252'. FIG. 9, on the other hand, shows the prior art connection plug 220' of the prior art accessory 210' in the mated configuration with a connection socket 252 according to the present invention. (In FIGS. 4, 8 and 9, prior art reference numerals are denoted by a single closing quote—e.g., the prior art accessory 210', the prior art connection plug 220' and the prior art connection socket 252'. Certain components of the prior art accessory 210', connection plug 220' and socket 252' may not be specifically described herein, but reference should in such event be had to corresponding components of the present invention marked with the same reference numeral, less the single closing quote.)

It will be appreciated from a consideration of FIGS. 4 and 8 that the improved accessory 210 according to the present invention possesses substantially the same outer dimensions, including the same dimensions for its electrical contact rings 240, 242, 244, 246, as in the prior art. Advantageously, therefore, the connection plug 220 of the improved accessory 210 offers the same connectivity with prior art connection sockets 252' (as do prior art connection plugs 220'). As such, the accessory 210 equipped with the connection plug 220 according to the present invention may be freely used with prior art connection sockets 252'—i.e., without diminishing the functionality of the prior art connection sockets 252'. Of course, when used with a connection socket 252 according to the present invention, the tip detection contact 248 on the connection plug 220 of the improved accessory 210 also provides additional functionality.

It will be appreciated from a consideration of FIGS. 4 and 9 that the connection socket 252 according to the present invention possesses substantially the same outer dimensions, including the same positioning and dimensions for each of its electrical contact pins 260, 262, 264, 266, as in the prior art. Advantageously, therefore, the connection socket 252 according to the invention offers the same connectivity with prior art connection plugs 220' (as do prior art connection sockets 252'). As such, the connection socket 252 according to the present invention may be freely used with prior art connection plugs 220'—i.e., without diminishing the functionality of the prior art connection plugs 220'. Of course, when used with a connection plug 220 provided on an improved accessory 210 according to the present invention, the tip detection pin 268 securely mounted on the connection socket 252 also provides additional functionality. (It may also be worthwhile to note that, advantageously, a prior art connection socket 252', or barrel, need not be unduly modified to be equipped with the positioning member 270 according to the present invention.)

FIG. 7 shows the connection plug 220 and socket 252 in the mated configuration, while FIGS. 5 and 6 show the connection plug 220 and socket 252, respectively, in disengaged configurations. It will be appreciated from FIGS. 6 and 7 that each of the contact pins 260, 262, 264, 266, as well as the tip detection pin 268, is adapted for respective resilient deformation. Preferably, the contact pins 260, 262, 264, 266 and the tip detection pin 268 will resiliently deform, when the substantially cylindrical bearing surface 226 or the conical tip portion 222 is urged thereagainst—e.g., when the connection plug 220 of the accessory 210 is inserted through a housing opening 250 (in a direction substantially indicated by arrow "A" in FIGS. 2 and 3) into the mated configuration with the connection socket 252. Preferably, upon removal of the connection plug 220 from the socket 252, the contact pins 260, 262, 264, 266 and the tip detection pin 268 may resiliently return to the configuration shown in FIG. 6.

As aforesaid, the tip detection module 180 may be operatively connected to the main processor 102. As such, the tip detection module 180 may pass acquired tip detection data to one or more software applications 134, and to store the tip detection data as may be required into flash memory 108 or RAM 106.

Accessory identification using the tip detection module 180 may be initiated by a user—in addition to by insertion of the accessory 210 itself—by controlling a dedicated notification button or a context dependent programmable button or key (on keyboard 116, for example) that may double as an actuator notification button.

It is worthwhile to here note that the serial number reference database and/or the look-up table may be provided onboard the mobile communications device 100 and/or remotely thereof. The serial number reference database and the look-up table may be periodically updated with new and/or amended accessory 210 identification information. At least to the extent that the serial number reference database and the look-up table may be provided onboard the mobile communications device 100, these updates could be made by wireless and/or wired connection, and via the wireless network 500, the communication subsystem 104, the auxiliary input/output subsystem 112, the data port 114, the short-range communications 122, the tip detection module 180, the control logic 182, the tip detection application 190, and/or one of the other modules 150 (e.g., an updating module).

According to some embodiments of the invention, the connection plug 220 may be removed from the accessory 210 and replaced with another connection plug 220. The second connection plug 220 may identify the accessory 210 using a different identification resistor 218 and/or serial number device 216 (or ID chip). In this manner, the replacement of one connection plug 220 with another may allow a change in the identification of the accessory 210. Changes in accessory 210 identification may be advantageous if the accessory 210 is partially defective, and/or where some functionality of the mobile communications device 100 may be wholly, or partially, determined in dependent relation upon the identification of the accessory 210. For example, a headset accessory 210 with microphone functionality may be provided with a first connection plug 220. In this example, the earphones of the headset accessory 210 may be of a particularly high quality. Should the microphone portion of the headset accessory 210 become defective, the first connection plug 220 may be replaced with a second connection plug 220. The second connection plug 220 may instead identify the accessory 210 as headphones (i.e., without any microphone functionality). In this manner, the user may be able to continue to use a partially defective accessory 210, with the mobile communications device 100 operating in a headphone accessory mode (instead of a headset accessory mode).

Figure 12:
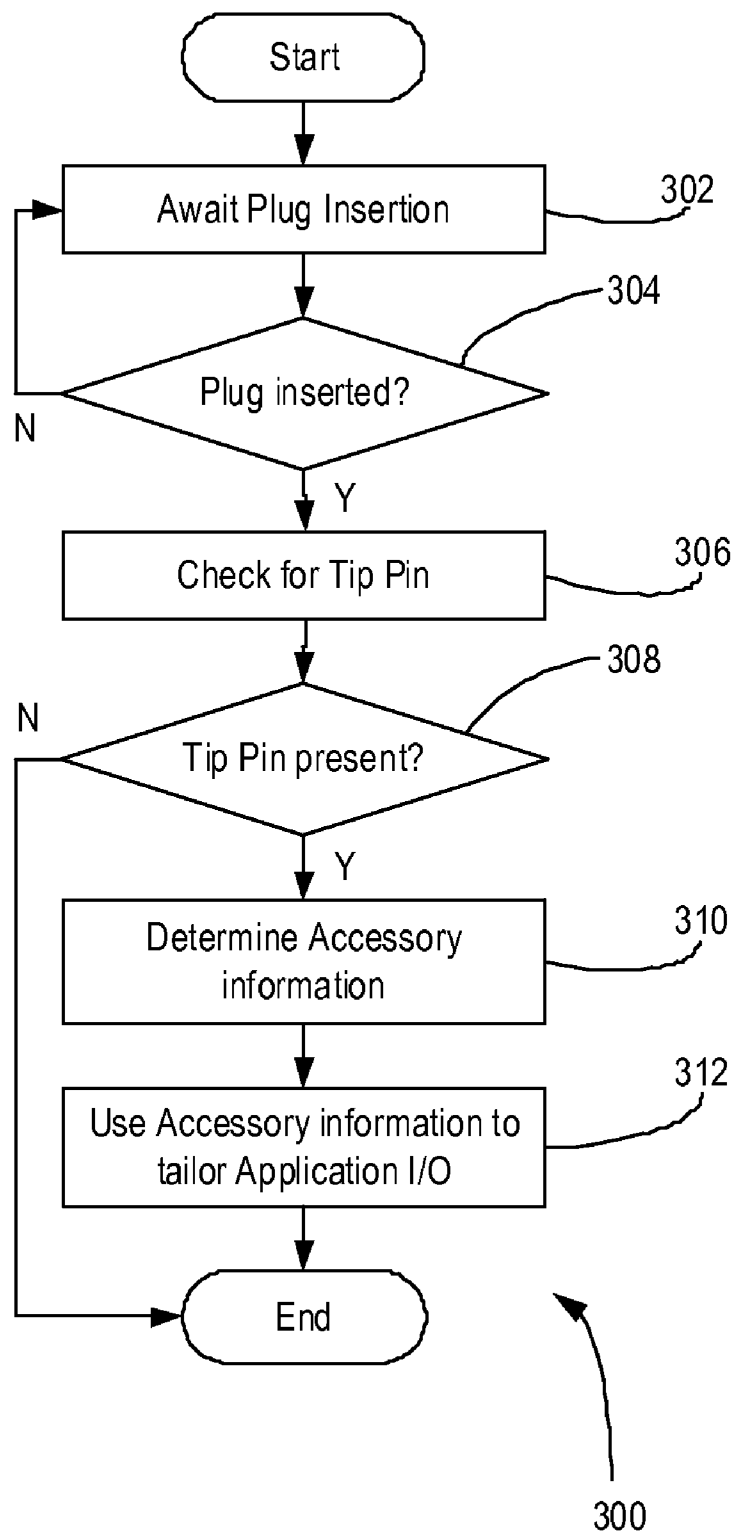
FIG. 12 is a flowchart of an illustrative method of identifying an accessory used with a mobile device according to the invention.

FIG. 12 shows, schematically by way of overview, an associated method 300 of identifying the accessory 210 used with the mobile device 100. Though the method 300 is described below with reference to the mobile communications device 100, the accessory identification system 200 and the accessory 210 described above, it is worthwhile to note the method 300 according to the present invention may be used apart therefrom. Similarly, certain aspects of the mobile communications device 100, the accessory identification system 200 and/or the accessory 210 may be described and/or expanded upon below with reference to the method 300. It is worthwhile to note any such aspects of the mobile communications device 100, the accessory identification system 200 and/or the accessory 210 according to the present invention may be used apart from the method 300.

Now, as further described below, the method 300 may preferably include steps (a) through (d), among others. Though not specifically shown in FIG. 12, in step (a) of the method 300, the tip detection pin 268 is provided on the mobile communications device 100 substantially adjacent to the interior end portion 274 of the connection socket 252. Also at the outset, and as indicated generally by reference numerals 302 and 304 in FIG. 12, the mobile communications device 100 awaits insertion of the connection plug 220 into the socket 252. Once the plug is inserted, the method 300 proceeds to step (b).

In step (b), and as indicated generally by reference numeral 306 in FIG. 12, the tip detection pin 268 is electrically coupled with a conical tip portion 222 of the connection plug 220 to check for the presence of the tip detection contact 248. If the tip detection pin 268 returns a null result, indicating the tip detection contact 248 is not present on the conical tip portion 222' of the connection plug 220', the method 300 may end and/or await insertion of a new connection plug 220 into the socket 252. If, on the other hand, the tip detection contact 248 is determined to be present on the conical tip portion 222 of the connection plug 220, the method 300 proceeds to step (c).

In step (c), and as indicated generally by reference numeral 310 in FIG. 12, the main processor 102 onboard the mobile communications device 100 is used to identify the accessory 210—i.e., provided that the tip detection contact 248 is present on the conical tip portion 222. The processor 102 may (i) compare a serial number, received from the serial number device 216 onboard the accessory 210, against a serial number reference database, and/or (ii) compare a first voltage [received from the identification resistor 218 of the accessory 210] with a second voltage [received, via the reference resistor 290 onboard the mobile communications device 100, from the identification resistor 218 of the accessory 210] and then compare a quotient of the two voltages against a look-up table. The serial number reference database and/or the look-up table may preferably, but need not necessarily, be provided onboard the mobile communications device 100.

Preferably, and as described elsewhere herein, the serial number reference database and the look-up table may be periodically updated with new and/or amended accessory 210 identification information—preferably, so as to enable identification of the accessory 210 based on at least a current serial number and/or resistance which may then be associated therewith. That is, from time to time, the serial number and/or resistance associated with an accessory 210 may change, and/or new serial numbers and/or resistances may be added to the serial number reference database and/or the look-up table for new and/or existing accessories 210, as appropriate. An identification of the accessory 210 may then be made with reference to the new identification information. In some cases, the old identification information for a particular accessory 210 may be preserved in the serial number reference database and/or in the look-up table—i.e., even after the new identification information is added and/or updated. In some such cases, identification may then be made with reference to the old and/or the new identification information for that accessory 210, as appropriate.

Preferably, updates to the serial number reference database and the look-up table may be made by wireless and/or wired connection. Updates to the serial number reference database and the look-up table may, preferably, be made via the wireless network 500, the communication subsystem 104, the auxiliary input/output subsystem 112, the data port 114, the short-range communications 122, the tip detection module 180, the control logic 182, the tip detection application 190, and/or one of the other modules 150 (e.g., an updating module).

Thereafter, in step (d) and as indicated generally by reference numeral 312 in FIG. 12, the processor 102 may preferably be used to automatically assign accessory input and output identities to the contact pins 260, 262, 264, 266 of the mobile communications device 100. Preferably, the accessory input and output identities may be assigned to the contact pins 260, 262, 264, 266 in dependence upon the identification of the accessory 210 in step (c).

It may be worthwhile to note that, although the mobile device 100 is shown as a mobile communication device in FIG. 2, the present invention is also suitable to identify other accessories 210 on other mobile and/or electronic devices 100, such as, for example, cellular phones, music players, and GPS receivers.

The software 134 may also attempt to again identify the accessory 210, upon a software timeout or upon powering-up the mobile communications device 100. Preferably, use of the present invention may enable the accessory 210 to always be synchronized with settings of the software 134.

As shown herein, the apparatus and methods described herein do not need to differentiate among accessories that might be connected to a connection socket on the basis of resistance. It is not necessary that there be cooperating plugs and sockets and/or specially designed shapes for the connection plug—e.g., an extra-long connection plug—to provide adequate space for a further electrical contact to carry the resistive identification data. The apparatus and methods described herein do not require unduly complex internal wiring and/or electrical coupling with an electronic device. They do not require the use of voltage interrupts to distinguish between different types of accessories. Further, as shown herein, the apparatus and methods described herein do not seek to provide extra poles, as additional electrical contact rings, along the limited length of the 3.5 mm plug's substantially cylindrical bearing surface. The apparatus and methods described herein do not suffer from mechanical problems, at least insofar as they do not provide an additional electrical contact ring along the cylindrical bearing surface which would not be in keeping with the standard layout of a 3.5 mm connection plug, and insofar as they meet the mechanical tolerances necessary to make proper contact with 'generic' headset accessories and/or with other types of 'non-conforming' accessories.

It will be appreciated that the apparatus and method described herein enable identification of coupled accessories. The apparatus and method described herein are suitable for use in identifying the accessories associated with mobile communications devices and/or other devices utilizing standard 3.5 mm connection plugs. The apparatus and method described herein make use of standard 3.5 mm connection plugs and/or sockets advantageous for the purpose of identifying which type of accessory is connected at any one time (and how signal processing should then be applied).

As also shown herein, the apparatus and method described herein do not impair the implementation of more elegant functionality and synergies between accessories and mobile communications devices including, for example, the functionality of various software applications for mobile communications devices which might otherwise have been designed to "decide" on the best use to make of a connected accessory.

Additionally, it will be appreciated that the apparatus and method described herein may advantageously provide an accessory identification system which works in association with standard connection plugs already on the market—e.g., standard mobile communications device connection plugs and sockets and/or 3.5 mm audio connection plugs.

Further, as shown herein, the apparatus and method described herein may advantageously electrically isolate the center of a conical tip portion from a remainder of a connection plug, so as to provide a tip detection contact. The apparatus and method described herein may advantageously provide a 3.5 mm plug with an additional electrical contact on its conical tip portion (e.g., a tip detection contact) to identify different accessories. The apparatus and method described herein provide an additional electrical (tip detection) contact or pole on the conical tip portion of a connection plug.

It will also be appreciated that the apparatus and method described herein may advantageously make it possible for the plug to maintain the same outer dimensions, including the same dimensions for each of the other electrical contacts already in use. Advantageously, therefore, the apparatus and method described herein may enable all of the same connectivity as afforded by current device sockets, with the additional functionality of a tip detection pin electrically connected to an isolated conical tip portion of the plug.

As additionally shown herein, the apparatus and method described herein may be an accessory and/or a mobile communications device which provides for ready identification of the accessory. The apparatus and method described herein may advantageously utilize a simple resistance protocol and/or a one-wire bidirectional interface. The apparatus and method described herein may advantageously be adapted for use with resistive identification methods and/or otherwise might be identified by resistance. The apparatus and method described herein may use a one-wire bidirectional interface, or a simple resistance protocol, in association with the tip detection contact to enable ready identification of the particular accessory attached to a mobile communications device.

Still further, it will be appreciated that the apparatus and method described herein may advantageously distinguish between certain branded and non-branded accessories, and provide for differing performance levels and/or qualities when one is used as compared to another.

As shown herein, the apparatus and method described herein may advantageously, with identification of one accessory or another, adapt the mobile communications device to, for example, automatically use a different audio mode, filter and/or level, otherwise optimize audio settings, and/or automatically select a special mode depending upon the type of accessory connected.

It will be appreciated that the apparatus and method described herein may advantageously work substantially seamlessly in association with prior art connection sockets on prior art devices and/or with other devices not supporting tip detection. Similarly, the apparatus and method described herein may advantageously enable prior art accessories (and/or other accessories not provided with a tip detection contact) to work substantially seamlessly in association with a connection socket on a device.

Thus, in an aspect, there is provided a mobile communications device for use with an accessory having a connection plug which defines a substantially conical tip portion, a distal end portion, and a substantially cylindrical bearing surface extending therebetween. The connection plug has one or more electrical contact rings, and a tip insulating ring extending about the conical tip portion to define a tip detection contact. The mobile communications device includes a tip detection pin, one or more electrical contact pins, a housing, and an accessory connection socket extending into the housing. The connection socket includes a substantially barrel-shaped bearing surface which defines one or more apertures formed therein. Each of the contact pins extends from a respective one of the apertures. The connection socket is adapted to engage the connection plug, with each of the contact pins engaging a respective one of the electrical contact rings, and with the tip detection pin engaging the tip detection contact of the connection plug to enable identification of the accessory by the mobile communications device.

In an embodiment, the connection socket may preferably extend inward from the housing towards an interior end portion of the connection socket. The mobile communications device may preferably also include a positioning member securely engaging the connection socket. The positioning member may preferably position the tip detection pin substantially adjacent to the interior end portion of the connection socket.

In a preferred embodiment, the mobile communications device may preferably also include a processor. Preferably, the processor may be operatively encoded to automatically assign accessory input and output identities to the contact pins. The accessory input and output identities may preferably be assigned to the contact pins in dependence upon the accessory identified by the mobile communications device.

In one embodiment, the contact pins are adapted to engage a microphone ring, a ground ring, and right and left channel out rings as the electrical contact rings of the accessory. Accordingly, the aforesaid identities assigned to the contact pins, by the processor, may preferably include a microphone pin identity, a ground pin identity, and right and left channel out pin identities. The mobile communication device may preferably be operatively adapted to receive a microphone signal from the microphone ring, to ground the ground ring, and to transmit right and left channel out signals to the right and left channel out rings.

In another embodiment, the mobile communications device may preferably be for use with a serial number device. The serial number device may preferably be electrically coupled between the tip detection contact and an operatively grounded one of the electrical contact rings. The mobile communications device may also include a serial bus master device, preferably for electrical coupling with the tip detection contact. A serial number reference database may preferably, but need not necessarily, be provided as part of the serial bus master device. Accordingly, the aforesaid identification of the accessory may be performed by serial number.

In one embodiment, the serial number reference database may preferably, but need not necessarily, be periodically updated, preferably so as to enable the aforesaid identification based on at least a then current serial number for each accessory.

In other embodiments, the mobile communications device may preferably be for use with an identification resistor. The identification resistor may preferably be electrically coupled between the tip detection contact and an operatively grounded one of the electrical contact rings. The mobile communications device may include a reference resistor and an analog/digital converter. The analog/digital converter may preferably have a direct first voltage connection and an indirect second voltage connection electrically coupled to the reference resistor. In operation, the tip detection contact may be electrically coupled, in parallel, with the direct first voltage connection and with the reference resistor. Accordingly, the aforesaid identification of the accessory may be performed by resistance.

In one embodiment, the mobile communications device may preferably, but need not necessarily, be periodically updated, preferably so as to enable the aforesaid identification based on at least a then current resistance for each accessory.

In another aspect, there is provided in an accessory having a connection plug for use with a mobile communications device. The connection plug has a substantially conical tip portion, a distal end portion, and a substantially cylindrical bearing surface extending therebetween. The connection plug also has one or more electrical contact rings, and a tip insulating ring extending about the conical tip portion to define a tip detection contact for identification of the accessory by the mobile communications device.

In an embodiment, the accessory may also include a serial number device, preferably electrically coupled between the tip detection contact and an operatively grounded one of the electrical contact rings. The serial number device may preferably be adapted for use with a serial number reference database. The serial number reference database may preferably, but need not necessarily, be provided onboard the mobile communications device. Accordingly, the aforesaid identification of the accessory may be performed by serial number.

In another embodiment, the accessory may include an identification resistor, preferably electrically coupled between the tip detection contact and an operatively grounded one of the electrical contact rings. The identification resistor may preferably be adapted for use with a reference resistor in the mobile communications device. Accordingly, the aforesaid identification of the accessory may be performed by resistance.

In a further aspect, there is provided a method of identifying an accessory having a connection plug inserted into a connection socket of a mobile communications device. The mobile communications device has a tip detection pin substantially adjacent to an interior end portion of the connection socket. The method includes steps (a) and (b). In step (a), upon electrical coupling of the tip detection pin with a conical tip portion of the connection plug, the method checks for the presence of a tip detection contact on the conical tip portion. In step (b), the accessory is identified when the tip detection contact is present on the conical tip portion.

In another embodiment, the method may preferably also include step (c). In step (c), a processor onboard the mobile communications device may preferably be used to automatically assign accessory input and output identities to contact pins of the mobile communications device. Preferably, the accessory input and output identities may be assigned to the contact pins in dependence upon the identification of the accessory in step (b).

In an embodiment, in step (b), a processor onboard the mobile communications device may compare a serial number, received from a serial number device onboard the accessory, against a serial number reference database. The serial number reference database may preferably, but need not necessarily, be provided onboard the mobile communications device.

In one embodiment, before and after step (b), the serial number reference database may preferably, but need not necessarily, be updated, preferably so as to enable the aforesaid identification based on at least a then current serial number for each accessory.

In other embodiments, in step (b), a processor onboard the mobile communications device may compare a first voltage with a second voltage. The first voltage may preferably be received from an identification resistor of the accessory. The second voltage may preferably be received from the identification resistor, in parallel to the first voltage, via a reference resistor of the mobile communications device.

In one embodiment, before and after step (b), the mobile communications device may preferably, but need not necessarily, be updated, preferably so as to enable the aforesaid identification based on at least a then current resistance for each accessory.

While illustrative embodiments have been described above, it will be appreciated that various changes and modifications may be made. More generally, the scope of the invention is defined by the following claims.

What is claimed is:

1. A mobile communications device for use with an accessory having a connection plug which defines a substantially conical tip portion, a distal end portion, and a substantially cylindrical bearing surface extending therebetween, with the connection plug having one or more electrical contact rings, and a tip insulating ring extending about the conical tip portion to define a tip detection contact, the mobile communications device comprising:

a) a tip detection pin, b) one or more electrical contact pins, c) a housing, and d) an accessory connection socket extending into the housing; wherein the connection socket includes a substantially barrel-shaped bearing surface which defines one or more apertures formed therein, with each of the contact pins extending from a respective one of the apertures; and wherein the connection socket is adapted to engage the connection plug, with each of the contact pins engaging a respective one of the electrical contact rings, and with the tip detection pin engaging the tip detection contact of the connection plug to enable identification of the accessory by the mobile communications device, wherein the device is for use with a serial number device electrically coupled between the tip detection contact and an operatively grounded one of the electrical contact rings, wherein the device further comprises a serial bus master device for electrical coupling with the tip detection contact, with the serial bus master device comprising a serial number reference database, to enable said identification of the accessory by serial number.

2. A device according to claim 1, wherein the serial number reference database is periodically updated to enable said identification based on at least a then current one said serial number for each said accessory.

3. A mobile communications device for use with an accessory having a connection plug which defines a substantially conical tip portion, a distal end portion, and a substantially cylindrical bearing surface extending therebetween, with the connection plug having one or more electrical contact rings, and a tip insulating ring extending about the conical tip portion to define a tip detection contact, the mobile communications device comprising:

a) a tip detection pin, b) one or more electrical contact pins, c) a housing, and d) an accessory connection socket extending into the housing; wherein the connection socket includes a substantially barrel-shaped bearing surface which defines one or more apertures formed therein, with each of the contact pins extending from a respective one of the apertures; and wherein the connection socket is adapted to engage the connection plug, with each of the contact pins engaging a respective one of the electrical contact rings, and with the tip detection pin engaging the tip detection contact of the connection plug to enable identification of the accessory by the mobile communications device, wherein the device is for use with an identification resistor electrically coupled between the tip detection contact and an operatively grounded one of the electrical contact rings, wherein the device further comprises a reference resistor and an analog/digital converter having a first voltage connection and a second voltage connection electrically coupled to the reference resistor; and wherein in operation, the tip detection contact is electrically coupled, in parallel, with the first voltage connection and with the reference resistor to enable said identification of the accessory by resistance.

4. A device according to claim 3, wherein the device is periodically updated to enable said identification based on at least a then current one said resistance for each said accessory.

5. An accessory comprising a connection plug for use with a mobile communications device, with the connection plug comprising:

a) a substantially conical tip portion, a distal end portion, and a substantially cylindrical bearing surface extending therebetween;

b) one or more electrical contact rings;

c) a tip insulating ring extending about the conical tip portion to define a tip detection contact for identification of the accessory by the mobile communications device; and d) a serial number device electrically coupled between the tip detection contact and an operatively grounded one of the electrical contact rings, with the serial number device adapted for use with a serial number reference database onboard the mobile communications device to enable said identification of the accessory by serial number.

6. An accessory comprising a connection plug for use with a mobile communications device, with the connection plug comprising:

a) a substantially conical tip portion, a distal end portion, and a substantially cylindrical bearing surface extending therebetween;

b) one or more electrical contact rings;

c) a tip insulating ring extending about the conical tip portion to define a tip detection contact for identification of the accessory by the mobile communications device; and d) an identification resistor electrically coupled between the tip detection contact and an operatively grounded one of the electrical contact rings, with the identification resistor adapted for use with a reference resistor in the mobile communications device to enable said identification of the accessory by resistance.

7. A method of identifying an accessory having a connection plug inserted into a connection socket of a mobile communications device, the mobile communications device having a tip detection pin substantially adjacent to an interior end portion of the connection socket, the method comprising the steps of:

a) upon electrical coupling of the tip detection pin with a conical tip portion of the connection plug, checking for the presence of a tip detection contact on the conical tip portion;

b) identifying the accessory when the tip detection contact is present on the conical tip portion; and c) using a processor onboard the mobile communications device to automatically assign accessory input and output identities to contact pins of the mobile communications device in dependence upon the identification of the accessory in step (b).

8. A method of identifying an accessory having a connection plug inserted into a connection socket of a mobile communications device, the mobile communications device having a tip detection pin substantially adjacent to an interior end portion of the connection socket, the method comprising the steps of:

a) upon electrical coupling of the tip detection pin with a conical tip portion of the connection plug, checking for the presence of a tip detection contact on the conical tip portion; and b) identifying the accessory when the tip detection contact is present on the conical tip portion, wherein in step (b), a processor onboard the mobile communications device compares a serial number, received from a serial number device onboard the accessory, against a serial number reference database onboard the mobile communications device.

9. A method according to claim 8, wherein before and after step (b), the serial number reference database is updated to enable said identification based on at least a then current one said serial number for each said accessory.

10. A method of identifying an accessory having a connection plug inserted into a connection socket of a mobile communications device, the mobile communications device having a tip detection pin substantially adjacent to an interior end portion of the connection socket, the method comprising the steps of:

a) upon electrical coupling of the tip detection pin with a conical tip portion of the connection plug, checking for the presence of a tip detection contact on the conical tip portion; and b) identifying the accessory when the tip detection contact is present on the conical tip portion, wherein in step (b), a processor onboard the mobile communications device compares a first voltage with a second voltage, with the first voltage received from an identification resistor of the accessory, and with the second voltage received from the identification resistor, in parallel to the first voltage, via a reference resistor of the mobile communications device.

11. A method according to claim 10, wherein before and after step (b), the mobile communications device is updated to enable said identification based on at least a then current one said resistance for each said accessory.

* * * * *